United States Patent
Matsuhira

(10) Patent No.: US 8,125,682 B2
(45) Date of Patent: Feb. 28, 2012

(54) IMAGE PROCESSING APPARATUS AND METHOD OF CONTROLLING THE SAME

(75) Inventor: Masatoshi Matsuhira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 706 days.

(21) Appl. No.: 12/329,473

(22) Filed: Dec. 5, 2008

(65) Prior Publication Data

US 2009/0147314 A1    Jun. 11, 2009

(30) Foreign Application Priority Data

Dec. 6, 2007 (JP) .................. 2007-315862
Nov. 26, 2008 (JP) .................. 2008-301429

(51) Int. Cl.
G06F 15/00 (2006.01)
G06T 5/00 (2006.01)
(52) U.S. Cl. .................. 358/1.6; 358/3.26
(58) Field of Classification Search .......... 358/1.6, 358/452, 448, 1.9, 3.03, 3.04, 3.26, 3.27, 358/463
See application file for complete search history.

(56) References Cited

U.S. PATENT DOCUMENTS

| | | | | |
|---|---|---|---|---|
| 5,604,825 A | * | 2/1997 | Hirota et al. | 382/261 |
| 5,784,499 A | * | 7/1998 | Kuwahara et al. | 382/264 |
| 7,286,717 B2 | * | 10/2007 | Nomizu | 382/280 |
| 2009/0147314 A1 | * | 6/2009 | Matsuhira | 358/2.1 |

FOREIGN PATENT DOCUMENTS

| | | |
|---|---|---|
| JP | 2002-044473 | 2/2002 |
| JP | 2003-189236 | 7/2003 |
| JP | 2006-279556 | 10/2006 |
| JP | 2006-330938 | 12/2006 |

* cited by examiner

*Primary Examiner* — Jerome Grant, II
(74) *Attorney, Agent, or Firm* — Nutter McClennen & Fish LLP; John J. Penny, Jr.

(57) ABSTRACT

An image processing apparatus including: an image source acquiring unit that acquires an image source; a determining unit that determines whether the image source acquired is a moving image source; a setting unit that sets a matrix size used in a noise elimination of a first plane to be larger than a matrix size used in a noise elimination of a second plane if the image source is a moving image source and sets the matrix size used in the noise elimination of the second plane to be larger than the matrix size used in the noise elimination of the first plane if the image source is a still image source; and a noise elimination unit that executes the noise elimination of the luminance and color difference planes on image data from the image source using the size of the matrix of the smoothing range.

7 Claims, 4 Drawing Sheets

| LEVEL | PIXEL NUMBER |
|---|---|
| 1 | 3 × 3 |
| 2 | 7 × 7 |
| 3 | 9 × 9 |
| 4 | 15 × 15 |
| 5 | 21 × 21 |

IMAGE PROCESSING APPARATUS AND METHOD OF CONTROLLING THE SAME

Priority is claimed to Japanese Patent Applications No. 2007-315862, filed on Dec. 6, 2007 and No. 2008-301429, filed on Nov. 26, 2008, the disclosures of which, including the specifications, drawings, and claims are incorporated herein by reference in their entireties.

BACKGROUND

1. Technical Field

The present invention relates to an image processing apparatus and a method of controlling the same, and more particularly, to an image processing apparatus capable of efficiently eliminating image noise and a method of controlling the same.

2. Related Art

An image processing apparatus such as a printer may print or display a still image from an image source that is a still image source or a moving image source. For example, in the printer, if the image source is a moving image source, the still image is generated based on the moving image source and the generated still image is printed.

JP-A-2003-189236 discloses a method of acquiring conditions such as sensitivity at the time of imaging and efficiently reducing image noise on the basis of the conditions at the time of imaging, with respect of the still image obtained from the still image source.

Meanwhile, the moving image source may be compressed with a higher compression rate than that of the still image source. In particular, the compression rate of a color difference component is high. In terms of image noise, a still image obtained from a still image source has a lot of white noise due to a lack of sensitivity, but a still image obtained from a moving image source has a lot of "mosquito," or compression noise.

Since the property of the image noise generated is different depending on whether the image source is a moving image source or a still image source, there is a need for properly eliminating image noise according to the type of image source.

SUMMARY

An advantage of some aspects of at least one embodiment of the invention is that it provides an image processing apparatus capable of efficiently eliminating image noise regardless of whether an image source is a moving image source or a still image source and a method of controlling the same.

According to an aspect of at least one embodiment of the invention, there is provided an image processing apparatus including: an image source acquiring unit that acquires an image source; a determining unit that determines whether the image source acquired by the image source acquiring unit is a moving image source or a still image source; a setting unit that sets a size of a matrix of a smoothing range used in a noise eliminating process of a color difference plane to be larger than a size of a matrix of a smoothing range used in a noise eliminating process of a luminance plane if the determining unit determines that the image source is the moving image source and sets the size of the matrix of the smoothing range used in the noise eliminating process of the luminance plane to be larger than the size of the matrix of the smoothing range used in the noise eliminating process of the color difference plane if the determining unit determines that the image source is the still image source; and a noise eliminating process executing unit which executes the noise eliminating process of the luminance plane and the noise eliminating process of the color difference plane, with respect to image data based on the image source acquired by the image source acquiring unit, by the size of the matrix of the smoothing range set by the setting unit.

In this case, the image processing apparatus may further include a first converting unit that converts the image data of the image source acquired by the image source acquiring unit into an expression in an YCbCr color space, and the noise eliminating process executing unit may execute the noise eliminating process on the image data that is converted into the expression in the YCbCr color space by the first converting unit.

In this case, the first converting unit may convert the image data expressed in an RGB color space into the expression in the YCbCr color space.

In this case, the image processing apparatus may further include a second converting unit that converts the image data, of which noise is eliminated by the noise eliminating process executing unit, into image data expressed by the RGB color space.

The image processing apparatus may further include a print unit that executes printing processes on the basis of the image data, which is subjected to the noise eliminating process by the noise eliminating process executing unit.

According to another aspect of at least one embodiment of the invention, there is provided a method of controlling an image processing apparatus, the method including: acquiring an image source of a moving image source or a still image source; determining whether the acquired image source is a moving image source or a still image source; setting a size of a matrix of a smoothing range used in a noise eliminating process of a color difference plane to be larger than a size of a matrix of a smoothing range used in a noise eliminating process of a luminance plane if it is determined that the image source is a moving image source and setting the size of the matrix of the smoothing range used in the noise eliminating process of the luminance plane to be larger than the size of the matrix of the smoothing range used in the noise eliminating process of the color difference plane if it is determined that the image source is a still image source; and executing the noise eliminating process of the luminance plane and the noise eliminating process of the color difference plane, with respect to image data based on the acquired image source, by the size of the matrix of the set smoothing range.

BRIEF DESCRIPTION OF THE DRAWINGS

The invention will be described with reference to the accompanying drawings, wherein like numbers reference like elements.

FIG. 3 is a view showing an example of the configuration of a level-based smoothing range table maintained by the image processing apparatus according to the embodiment of the invention.

DESCRIPTION OF EXEMPLARY EMBODIMENTS

Hereinafter, an embodiment of the invention will be described with reference to the accompanying drawings. The following embodiment does not restrict the technical range of the invention.

Figure 1:
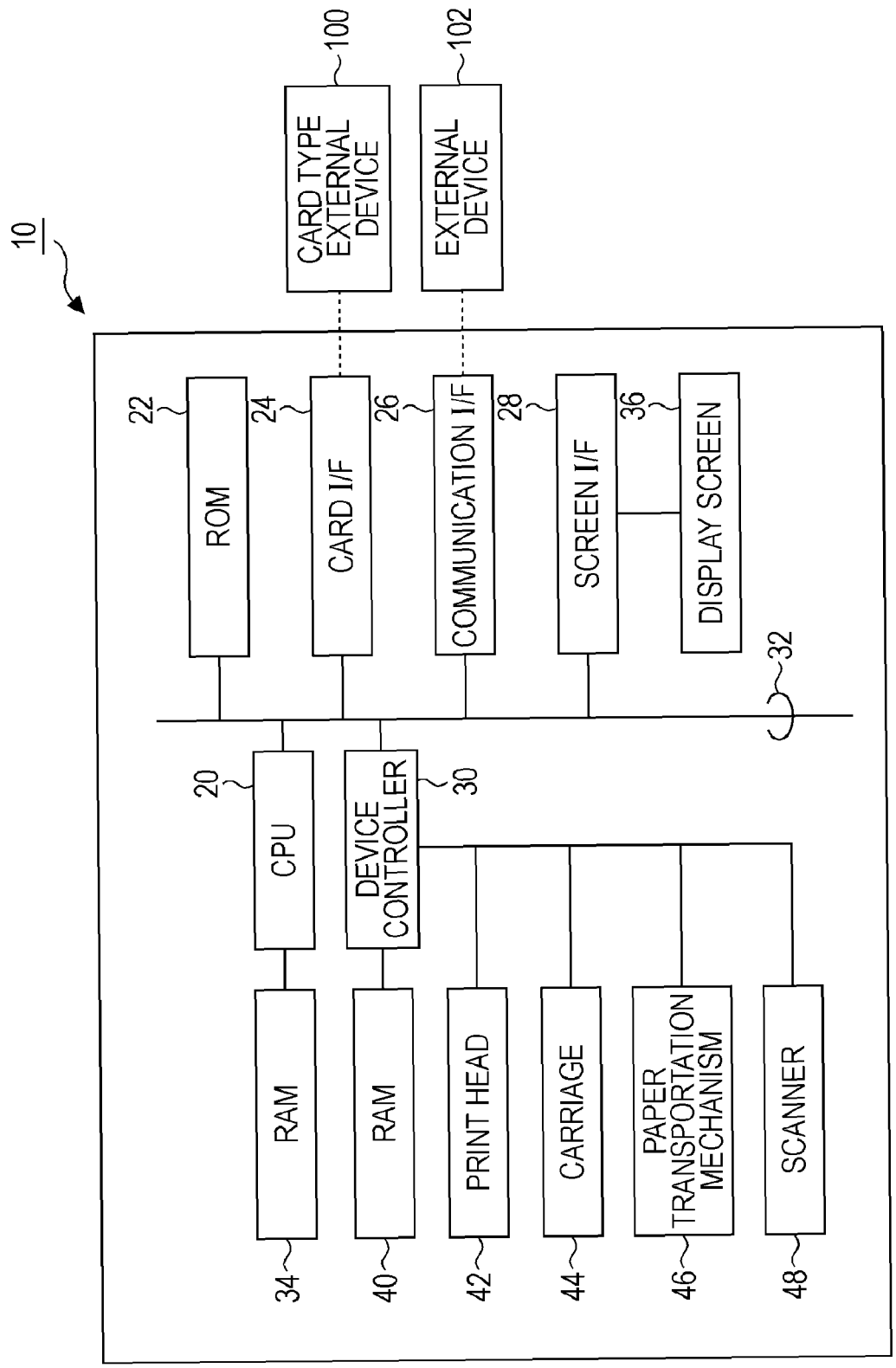
FIG. 1 is a block diagram showing an example of the internal configuration of an image processing apparatus according to an embodiment of the invention.

FIG. 1 is a block diagram showing an example of the internal configuration of an image processing apparatus 10 according to an embodiment of the invention. As shown in FIG. 1, an image processing apparatus 10 according to the present embodiment is constituted by a printer and more particularly a color ink jet printer. The image processing apparatus 10 is not limited to the printer and may be constituted by an image display apparatus such as a photo viewer.

As shown in FIG. 1, the image processing apparatus 10 includes a central processing unit (CPU) 20, a read only memory (ROM) 22, a card interface 24, a communication interface 26, a screen interface 28, and a device controller 30, all of which are connected to each other by an internal bus 32.

The CPU 20 is connected to a random access memory (RAM) 34 that is a volatile memory. For example, the CPU 20 reads and executes various types of programs stored in the ROM 22 so as to control the image processing apparatus 10. When a program is executed, the CPU 20 temporarily stores data in the RAM 34, if necessary.

The ROM 22 is an example of a nonvolatile memory and nonvolatilely stores various types of programs or data of the image processing apparatus 10. The card interface 24 is an interface for using a card type external device 100, such as a PC card, inserted into the image processing apparatus 10. For example, various types of cards such as a flash memory card, a hard disc, a SCSI card and a modem card may be used as the PC card.

The communication interface 26 is an interface for connecting an external device 102 such as a notebook type or a desktop personal computer or an image pickup device such as a camera to the image processing apparatus 10. A wired standard such as USB or RS232C or a wireless standard such as IrDA or Bluetooth may be used as the connection standard between the image processing apparatus 10 and the external device 102.

The screen interface 28 is an interface of a display screen 36 provided in the image processing apparatus 10. The display screen 36 is constituted by, for example, a liquid crystal display (LCD). In the present embodiment, a thumbnail image for enabling a user to select an image to be printed is displayed on the display screen 36. This display screen 36 is constituted by a touch panel and also functions as a user interface for enabling the user to input a command to the image processing apparatus 10.

The device controller 30 is connected to a RAM 40, a print head 42, a carriage 44, a paper transportation mechanism 46 and a scanner 48 and mechanically controls the print head 42, the carriage 44, the paper transportation mechanism 46 and the scanner 48. The RAM 40 is the dedicated nonvolatile memory of the device controller 30, which temporarily stores data necessary for the mechanical control of the device controller 30. This device controller 30 is constituted by, for example, an application specific integrated circuit (ASIC).

In the present embodiment, in particular, the device controller 30 controls a printing process using the print head 42, the carriage 44 and the paper transportation mechanism 46. That is, an image is printed on a print medium such as paper while a print ink is discharged from the print head 42 mounted in the carriage 44 and the carriage 44 is alternately moved in a scan direction (perpendicular to a paper transportation direction). The paper transportation mechanism 46 sequentially transport the print medium such as paper in the paper transportation direction according to the printing process using the carriage 44 so as to print an image on the print medium.

The device controller 30 controls the printing process when an image is read using the scanner 48. For example, a series of processes of reading an original, which is laid on an image read surface of the scanner 48 by the user, using a line image sensor and temporarily storing the image data in the RAM 44 is performed.

Figure 2:
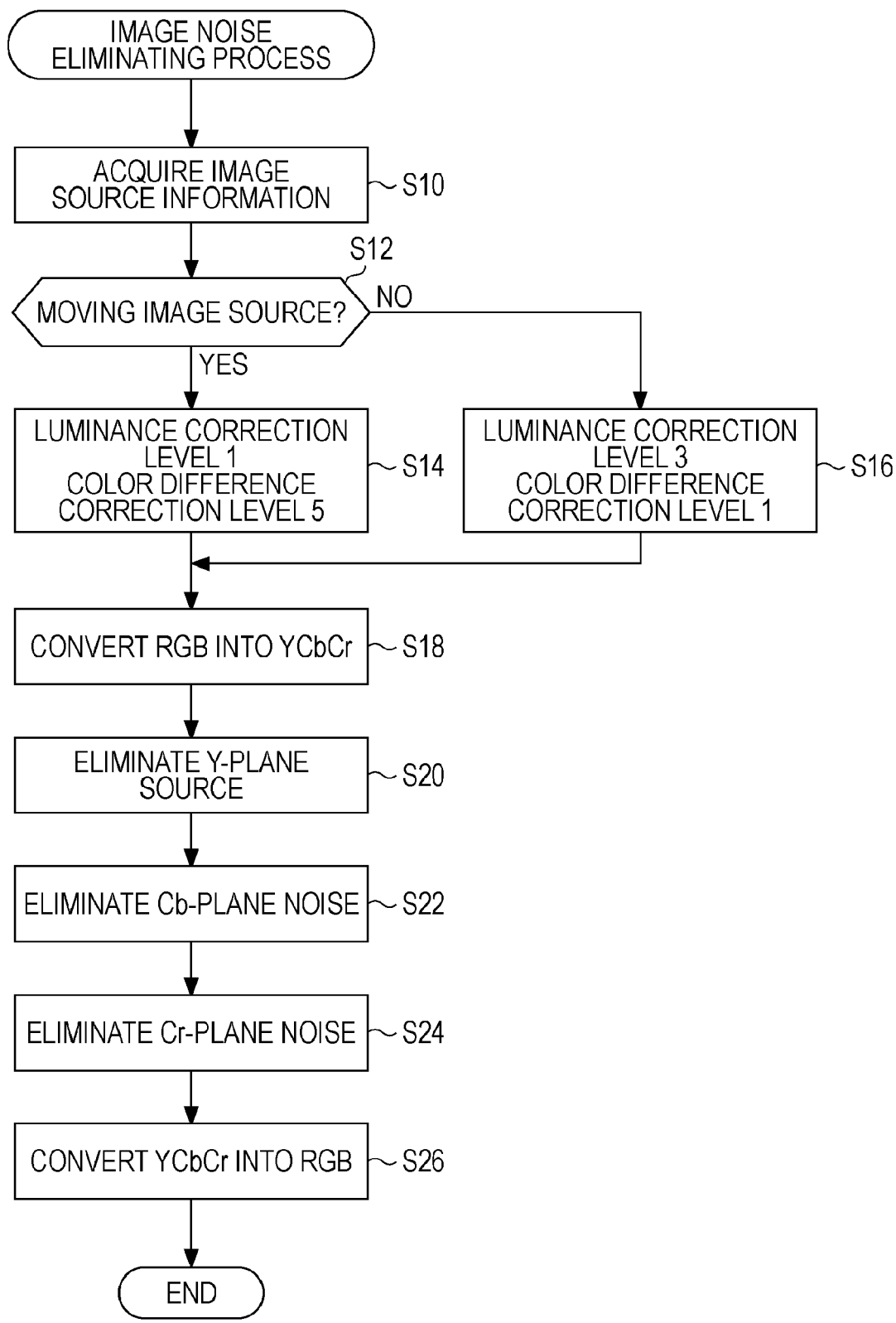
FIG. 2 is a flowchart showing an example of an image noise eliminating process executed by the image processing apparatus according to the embodiment of the invention.

Next, an image noise eliminating process executed by the image processing apparatus 10 according to the present embodiment will be described with reference to FIG. 2. FIG. 2 is a flowchart showing an example of the image noise eliminating process executed by the image processing apparatus 10. The image noise eliminating process is, for example, realized by reading and executing an image eliminating program stored in the ROM 22 by the CPU 20. This image noise eliminating process is executed as a portion of a printing process when the user specifies an image to be printed or a layout in the image processing apparatus 10 and instructs the print.

First, as shown in FIG. 2, the image processing apparatus 10 acquires image source information (step S10). For example, image data of the image source stored in the card type external device 100 is read. The file of the image source to be read is previously specified by the user or is automatically specified on the basis of a process executed by the image processing apparatus 10.

Next, the image processing apparatus 10 determines whether or not the read image source is a moving image source (step S12). That is, the image processing apparatus 10 determines whether the read image source is a moving image source or a still image source. In the present embodiment, this determination is performed using an extension of a file name. For example, if the extension of the file name is mpg, rm, avi, or mov, the file is a moving image file and the image source is determined to a moving image source. In contrast, if the extension of the file name is jpg, gif, png or bmp, the file is a still image file and the image source is determined to a still image source.

It may be determined whether the image source is a moving image source or a still image source on the basis of information other than the extension of the file name. For example, if information indicating the moving image file or the still image file is included in the data in the file, the determination may be performed on the basis of the data.

If it is determined that the read image source is a moving image source (step S12: YES), the image processing apparatus 10 sets a luminance correction level to "1" and sets a color difference correction level to "5" (step S14).

In contrast, if it is determined that the read image source is not a moving image source (step S12: NO), that is, if it is determined that the read image source is a still image source, the image processing apparatus 10 sets the luminance correction level to "3" and sets the color difference correction level to "1" (step S16).

After the step S14 or the step S16, the image processing apparatus 10 converts image data expressed in an RGB color space into an expression in an YCbCr color space (step S18).

Next, the image processing apparatus 10 eliminates Y-plane noise of the image data obtained in the step S18 (step S20). When the noise is eliminated, a smoothing process is performed. The size of a matrix of a smoothing range used in the smoothing process is changed according to the level set in the step S14 or the step S16.

FIG. 3 is a view showing an example of a level-based smoothing range table TB10 for maintaining a relationship between the level set in the step S14 or the step S16 and the size of the matrix of the smoothing range. In the present embodiment, the level-based smoothing range table TB10 is, for example, stored in the ROM 22 and is referred to by the image processing apparatus 10 if necessary.

As shown in FIG. 3, in the present embodiment, the smoothing process is performed using a matrix having 3×3 pixels in a level 1, the smoothing process is performed using a matrix having 7×7 pixels in a level 2, the smoothing process is performed using a matrix having 9×9 pixels in a level 3, the smoothing process is performed using a matrix having 15×15 pixels in a level 4, and the smoothing process is performed using a matrix having 21×21 pixels in a level 5. In the smoothing process, an operator of each of the pixels in the matrix of the smoothing range is set to any value and may be arbitrarily weighted.

Next, as shown in FIG. 2, the image processing apparatus 10 eliminates Cb-plane noise of the image data obtained in the step S18 (step S22) and eliminates Cr-plane noise (step S24). Even when the noise is eliminated in the step S22 and the step S24, a smoothing process is performed, but the size of the matrix of the smoothing range used in the smoothing process is changed on the basis of the level set in the step S14 or the step S16, similar to the step S20.

Next, the image processing apparatus 10 converts the image data expressed in the YCbCr color space, of which the noise is eliminated, into an expression in the RGB color space (step S26). That is, the image data is returned to the original RGB color space. Accordingly, the image noise eliminating process according to the present embodiment is finished.

After the image noise eliminating process is finished, the image processing apparatus 10 executes a printing process on the basis of the image data of which the noise is eliminated in the image noise eliminating process. That is, the printing process is performed by driving the print head 42, the carriage 44 and the paper transportation mechanism 46 on the basis of the image data of which the noise is eliminated. Accordingly, a still image is printed on a print medium.

According to the image noise eliminating process of the present embodiment, the image processing apparatus 10 sets the luminance correction level to "3" and sets the color difference correction level to "1" if the image source is a still image source such that a smoothing filter filters only a non-edge portion of the luminance plane (Y plane). Accordingly, it is possible to efficiently suppress random noise of a luminance portion of the still image.

In contrast, if the image source is a moving image source, the image processing apparatus 10 sets the luminance correction level to "1" and sets the color difference correction level to "5" such that a smoothing filter having a large range filters a color difference plane (Cb plane and Cr plane). Accordingly, it is possible to efficiently suppress block noise of a color difference portion of the moving image.

The size of the matrix of the smoothing range used in the noise eliminating process of the color difference plane is set to be larger than the size of the matrix of the smoothing range used in the noise eliminating process of the luminance plane if the image source is a moving image source and the size of the matrix of the smoothing range used in the noise eliminating process of the luminance plane is set to be larger than the size of the matrix of the smoothing range used in the noise eliminating process of the color difference plane if the image source is a still image source, such that the inherent image noise of the moving image and the inherent image noise of the still image can be efficiently eliminated.

The invention is not limited to the above-described embodiment and may be variously modified. For example, although, in the above-described embodiment, the luminance correction level is set to "3" and the color difference correction level is set to "1" if the image source is a still image source and the luminance correction level is set to "1" and the color difference correction level is set to "5" if the image source is a moving image source, the luminance correction level and the color difference correction level may be arbitrarily modified. Although five levels are provided in the present embodiment, the number of levels may be arbitrarily set. The size of the matrix of the smoothing range also may be arbitrarily set.

Although the image data of the image source acquired in the step S10 is expressed in the RGB color space in the above-described embodiment, the image data of the acquired image source may be expressed in other color spaces. If the image data of the acquired image source is expressed in the YCbCr color space, the converting process of the step S18 is unnecessary and the converting process of returning to the original color space in the step S26 is unnecessary.

With respect to the image noise eliminating process of the above-described embodiment, a program for executing the image noise eliminating process may be recorded in a recording medium such as a flexible disk, a compact disc-read only memory (CD-ROM), a ROM or a memory card and may be distributed in the form of the recording medium. In this case, the program recorded on the recording medium is read from the image processing apparatus 10 and is executed so as to realize the above-described embodiment.

The image processing apparatus 10 may include other programs such as an operating system or other application programs. In this case, in order to make use of the other programs included in the image processing apparatus 10, among the programs included in the image processing apparatus 10, a program including a command for reading a program for realizing the same process as the above-described embodiment may be recorded on the recording medium.

This program may be distributed over a network instead of the recording medium. The program transmitted over the network is input to the image processing apparatus 10 and is executed such that the above-described embodiment is realized.

When the program is recorded on the recording medium or is transmitted over the network, the program may be encrypted or compressed. In this case, the image processing apparatus 10 for reading the program from the recording medium or the carrier needs to decrypt or decompress the program.

Although the image noise eliminating process is realized in software in the above-described embodiment, the process may be realized in hardware such as an application specific IC (ASIC). This process also may be realized in a combination of software and hardware.

Figure 4:
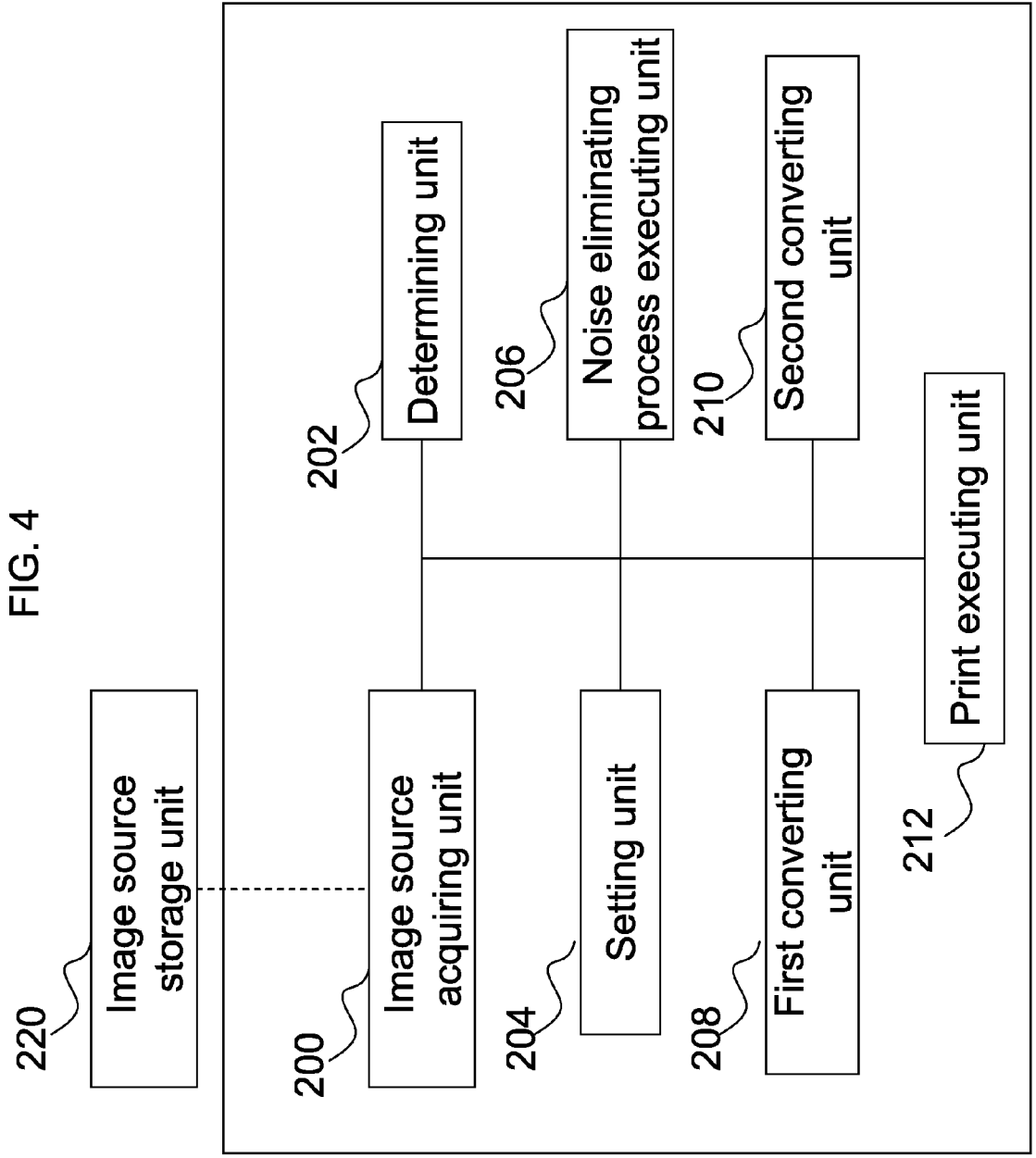
FIG. 4 is a block diagram showing an example of an image processing apparatus 10 when the image noise eliminating process is achieved with hardware.

FIG. 4 shows a block diagram of some of the hardware of the image processing apparatus 10. As shown in FIG. 4, the image processing apparatus 10 also includes an image source acquiring unit 200, a determining unit 202, a setting unit 204, a noise eliminating processing executing unit 206, a first converting unit 208, a second converting unit 210, and a print executing unit 212. These units are mutually connected. Specifically, the image source acquiring unit 200 corresponds to a portion or the entirety of CPU 20 that executes a program for acquiring information of an image source, the interfaces controlled by the CPU as required by the program (Card I/F 24, Communication I/F 26, or the device controller 30 for acquiring an image from scanner 48), and memory portions in the ROM 22 or RAM 34 used by the CPU. The determining unit 202 corresponds to a portion or the entirety of CPU 20 that executes a program for determining whether the image source is a moving image source and memory portions in the ROM 22 or RAM 34 used by the CPU. The setting unit 204 corresponds to a portion or the entirety of CPU 20 that executes a program for setting one or more levels for a noise eliminating process and memory portions in the ROM 22 or RAM 34 used by the CPU. The noise eliminating process executing unit 206 corresponds to a portion or the entirety of CPU 20 that executes a program for eliminating noise in an image acquired from the image source and the memory portions in the ROM 22 or RAM 34 used by the CPU. The first and second converting units 208 and 210 correspond to a portion or the entirety of CPU 20 that executes a program for converting the image according to the noise eliminating process and the memory portions in the ROM 22 or RAM 34 used by the CPU. The print executing unit 212 corresponds to a portion or the entirety of the CPU that executes a program for printing the image and the device controller for controlling the RAM 40, the print head 42, the carriage 44, and the paper transportation mechanism 46 for printing the image on a printing medium.

What is claimed is:

1. An image processing apparatus comprising:
   an image source acquiring unit that acquires an image source;
   a determining unit that determines whether the image source acquired by the image source acquiring unit is a moving image source or a still image source;
   a setting unit that sets a size of a matrix of a smoothing range used in a noise eliminating process of a color difference plane to be larger than a size of a matrix of a smoothing range used in a noise eliminating process of a luminance plane if the determining unit determines that the image source is the moving image source and sets the size of the matrix of the smoothing range used in the noise eliminating process of the luminance plane to be larger than the size of the matrix of the smoothing range used in the noise eliminating process of the color difference plane if the determining unit determines that the image source is the still image source; and
   a noise eliminating process executing unit that executes the noise eliminating process of the luminance plane and the noise eliminating process of the color difference plane on image data from the image source acquired by the image source acquiring unit, using the size of the matrix of the smoothing range set by the setting unit.

2. The image processing apparatus according to claim 1, further comprising a first converting unit that converts the image data of the image source acquired by the image source acquiring unit into an expression in an YCbCr color space,
   wherein the noise eliminating process executing unit executes the noise eliminating process on the image data that is converted into the expression in the YCbCr color space by the first converting unit.

3. The image processing apparatus according to claim 2, wherein the first converting unit converts the image data expressed in an RGB color space into the expression in the YCbCr color space.

4. The image processing apparatus according to claim 3, further comprising a second converting unit that converts the image data, of which noise is eliminated by the noise eliminating process executing unit, into image data expressed in the RGB color space.

5. The image processing apparatus according to claim 1, further comprising a print executing unit that executes a printing process on the basis of the image data.

6. A method of controlling an image processing apparatus, the method comprising:
   acquiring an image source;
   determining whether the acquired image source is a moving image source or the still image source;
   setting a size of a matrix of a smoothing range used in a noise eliminating process of a color difference plane to be larger than a size of a matrix of a smoothing range used in a noise eliminating process of a luminance plane if it is determined that the image source is the moving image source and setting the size of the matrix of the smoothing range used in the noise eliminating process of the luminance plane to be larger than the size of the matrix of the smoothing range used in the noise eliminating process of the color difference plane if it is determined that the image source is the still image source; and
   executing the noise eliminating process of the luminance plane and the noise eliminating process of the color difference plane on image data from the acquired image source, using the size of the matrix of the set smoothing range.

7. An image processing apparatus comprising:
   an image source;
   a determining unit that determines whether the image source is a moving image source or a still image source;
   a setting unit that sets a size of a matrix of a smoothing range used in a noise eliminating process of a color difference plane to be larger than a size of a matrix of a smoothing range used in a noise eliminating process of a luminance plane if the determining unit determines that the image source is the moving image source and sets the size of the matrix of the smoothing range used in the noise eliminating process of the luminance plane to be larger than the size of the matrix of the smoothing range used in the noise eliminating process of the color difference plane if the determining unit determines that the image source is the still image source; and
   a noise eliminating process executing unit that executes the noise eliminating process of the luminance plane and the noise eliminating process of the color difference plane on image data from the image source acquired by the image source acquiring unit, using the size of the matrix of the smoothing range set by the setting unit.

* * * * *